(12) United States Patent
Pascale

(10) Patent No.: US 9,937,427 B2
(45) Date of Patent: *Apr. 10, 2018

(54) VARIABLE SOUND GENERATOR

(76) Inventor: Robert Pascale, Matthews, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/482,087

(22) Filed: May 29, 2012

(65) Prior Publication Data
US 2013/0324009 A1 Dec. 5, 2013

(51) Int. Cl.
A63H 3/28 (2006.01)

(52) U.S. Cl.
CPC .................................. A63H 3/28 (2013.01)

(58) Field of Classification Search
CPC .................................. A63H 5/00; A63H 3/28
USPC ............................ 446/81, 270, 297, 397, 404
See application file for complete search history.

(56) References Cited

U.S. PATENT DOCUMENTS

| 4,432,159 | A | | 2/1984 | Kanno |
| 4,662,260 | A | * | 5/1987 | Rumsey ........................... 84/653 |
| 5,471,192 | A | * | 11/1995 | Dash ........................... 340/384.3 |
| 5,674,076 | A | * | 10/1997 | Billings et al. ............... 434/365 |
| 6,098,571 | A | * | 8/2000 | Axelrod et al. ............... 119/707 |
| 6,150,947 | A | * | 11/2000 | Shima ........................... 340/692 |
| 6,200,188 | B1 | | 3/2001 | Filo |
| 6,215,978 | B1 | * | 4/2001 | Ruzic et al. ................... 434/311 |
| 6,371,053 | B1 | | 4/2002 | Tsengas |
| 6,431,937 | B1 | | 8/2002 | Lau et al. |
| 6,481,381 | B2 | | 11/2002 | Ritchey |
| 6,578,527 | B1 | * | 6/2003 | Mathers ........................... 119/707 |
| 6,892,674 | B1 | * | 5/2005 | Dubinins et al. ............. 119/707 |
| 7,074,106 | B1 | * | 7/2006 | Deutsch et al. ............... 446/175 |
| 7,121,230 | B2 | | 10/2006 | Ritchey |
| 7,144,293 | B2 | | 12/2006 | Mann et al. |
| 8,025,550 | B2 | | 9/2011 | Tsengas et al. |
| 8,322,308 | B2 | * | 12/2012 | Curry et al. ................... 119/707 |
| 8,398,451 | B2 | * | 3/2013 | Wolfe et al. ................... 446/175 |
| 2001/0049249 | A1 | | 12/2001 | Tachau et al. |
| 2005/0005873 | A1 | * | 1/2005 | Gick ............................... 119/707 |
| 2005/0287911 | A1 | | 12/2005 | Schulze |
| 2006/0084360 | A1 | * | 4/2006 | Stern ............................... 446/397 |
| 2006/0249096 | A1 | * | 11/2006 | Gick ............................... 119/707 |
| 2008/0011244 | A1 | * | 1/2008 | Gick ............................... 119/707 |
| 2010/0199924 | A1 | | 8/2010 | del Pinal et al. |
| 2011/0034103 | A1 | | 2/2011 | Fong |
| 2011/0045736 | A1 | * | 2/2011 | Wooten ........................... 446/397 |

(Continued)

Primary Examiner — Melba Bumgarner
Assistant Examiner — Joseph B Baldori
(74) Attorney, Agent, or Firm — Harvey Lunenfeld

(57) ABSTRACT

The device includes an accelerometer for sensing movement in more than one direction, a sound chip for generating a pre-recorded sound in response to the sensed movement and a circuit for controlling the speed at which the pre-recorded sound is generated in response to the sensed movement, as a function of the direction of the sensed movement. The accelerometer senses the magnitude of movement. The sound chip generates sound in response to movement of a magnitude exceeding a pre-set level. The accelerator senses movement in at least two, preferably three directions. The sound chip includes an oscillator which determines the speed at which a pre-recorded sound is processed. The control means provides a control signal which sets the sound chip to generate the sound signal with a speed which is a function of the number of directions of sensed movement.

13 Claims, 3 Drawing Sheets

(56) References Cited

U.S. PATENT DOCUMENTS

2011/0065354 A1\* 3/2011 Wolfe et al. .................. 446/297
2011/0195632 A1\* 8/2011 Chow .......................... 446/397
2011/0244973 A1 10/2011 Brown et al.

\* cited by examiner

VARIABLE SOUND GENERATOR

BACKGROUND OF THE INVENTION

1. Field of the Invention

The present invention relates to sound generators and more particularly to a sound generator which is capable of generating sounds of different characteristics depending upon the direction of movement to which it is subjected.

2. Description of Prior Art Including Information Disclosed Under 37 CFR 1.97 and 1.98

It is known in the art to provide a pet toy in the form a plush stuffed animal with an internal sound generating device activated by external pressure applied to the toy by the jaws of the pet, as the pet chews on the toy. Toys having sound generating capability are particularly well suited for use with pets such as dogs and cats. They enhance the play value of the toy by creating a sound in response to the application of pressure by the pet.

Typically, the sound generating device located within the toy includes an air chamber having a port within which a reed or whistle is situated. As the pet applies pressure to the exterior of the toy, the air is squeezed out of the chamber through the port, causing the reed or whistle to emit a sound. For example, see for example U.S. Pat. No. 7,144,293.

However, toys having this type of squeeze activated sound emitter are limited to producing only a single sound. Accordingly, such toys enhance the attractiveness of the toy to the pet only to a limited extent.

Another approach that has been employed is to use a prerecorded sound chip. For example, U.S. Pat. No. 6,371,053 teaches an animal toy with a sound chip assembly that includes a shaker barrel activator, a prerecorded sound chip and a battery. The device is designed to emit a prerecorded sound in response to movement of sound chip assembly. The sound can be a prerecorded sound such as an animal's voice (meow, prrr), a beeping sound, a human voice, other voices, user recorded voices, etc., and can last for any desired period. U.S. Pat. No. 8,025,550 discloses a similar toy, but the device also includes a cage and LED lights.

U.S. Patent Publication No. 2010/0199924 relates to a pet toy having a sound module that includes an integrated circuit, and a power source, connected to a speaker such that, upon actuation of the device through movement or otherwise, a signal is generated causing an audible sound.

U.S. Pat. Nos. 6,200,188 and 6,431,937 disclose various toys that make noises in response to movement. These patents teach devices with an electronic circuit that includes a speaker and an optical sensor or motion sensor, where the optical sensor may cause activation of the speaker driver in response to movement sensed by the optical sensor.

U.S. Pat. Nos. 6,481,381 and 7,121,230 disclose a pet-play apparatus configured for interactive use. These patents teach a cat toy that includes a toy animal, like a mouse, attached to the end of a lasso. A sonic device that includes an electronic circuit with a piezoelectric element configured to produce a prey sound when subjected to motion is employed.

U.S. Patent Publication No. 2001/0049249 discloses an interactive toy, such as a toy tank or plane, that includes memory and a processor, where the memory stores both a number of different play scenarios as well as a child's previous play pattern, and the toy includes one or more movable portions, such as a wing or landing gear, where a sensor detects the movement of the movable portion and the processor, coupled to the sensor and the memory, responds to a movement of the movable portion, the stored play pattern, and a play scenario by causing a sound to be synthesized in real-time.

U.S. Patent Publication No. 2011/0244973 discloses a play system accessory with motion-activated sound module. This document teaches a support configured to be suspended from or supported on a play system with a sound module including a motion detector for detecting motion of the support and a sound-emitting device for emitting sounds in response to motion of the support.

U.S. Pat. No. 4,432,159 discloses a toy and associated noise producing mechanism. The toy has a base, and a rotating member on the base that is capable of rotating both clockwise and counterclockwise such that in response to rotation of the rotating member in a clockwise and counterclockwise direction, respectively, the rotating member contacts and engages the member and moves the member in a first and a second direction, respectively. A noise emitting mechanism is also located on the base and is operatively associated with the member. The noise emitting mechanism is capable of emitting at least two different types of noise.

However, none of the above noted references teach a pet toy with an internal sound generating circuit capable of creating different sounds depending upon the direction of motion being sensed. More particularly, none of those references teach a battery powered device for use in a pet toy or the like including accelerometer connected to a control circuit which regulates a sound chip to cause the device to emit a sound the characteristics of which are a function of the direction of the motion sensed by the accelerometer.

It is, therefore, a prime object of the present invention to provide a variable sound generator suitable for use in a toy, including a pet toy.

It is another object of the present invention to provide a variable sound generator which includes an accelerometer capable of sensing movement in more than one direction.

It is another object of the present invention to provide a variable sound generator including a control circuit which regulates the characteristics of the sound emitted in accordance with the direction of movement sensed by the accelerometer.

It is another object of the present invention to provide a variable sound generator which including a control circuit which regulates the speed at which a pre-recorded sound is emitted in accordance with the direction of movement sensed by the accelerometer.

It is another object of the present invention to provide a variable sound generator which including a control circuit which sets the speed at which a sound chip operates to vary the generated sound.

It is another object of the present invention to provide a variable sound generator which includes an optional amplifier circuit for regulating the volume of the sound emitted.

It is another object of the present invention to provide a variable sound generator which includes a generally spherical housing into which the sound generating circuitry is situated.

BRIEF SUMMARY OF THE INVENTION

The above objects are achieved by the present invention which relates to a device for producing sound. The device includes means for sensing movement in more than one direction, means for generating sound in response to the sensed movement and means for controlling the characteristics of the sound generated in response to the sensed movement as a function of the direction of the sensed movement.

The movement sensing means senses the magnitude of movement. The sound generating means generates sound in response to movement of a magnitude exceeding a pre-set level.

The movement sensing means senses movement in at least two directions. Preferably, the movement sensing means senses movement in three directions.

The sound generating means includes an oscillator which determines the speed at which a pre-recorded sound is processed. The control means provides a control signal which sets the oscillator to cause the sound generating means to generate a sound signal at a speed which is a function of the number of directions of sensed movement.

More specifically, the oscillator control signal causes the sound generating means to generate a sound at a first speed in response to movement in one direction. The oscillator control signal causes the sound generating means to generate a sound of at a second speed in response to movement in two directions. The oscillator control signal causes the sound generating means to generate a sound of at a third speed in response to movement in three directions.

The control means includes series connected resistors and means for bypassing selected ones of the resistors, depending upon the number of directions in which movement is sensed.

The control means includes series connected resistors, at least one of which resistors is connected in parallel with a bypass transistor, wherein the bypass transistor is not actuated when movement in one direction is sensed.

The control means includes series connected resistors, at least two of which resistors are connected in parallel with bypass transistors, wherein a selected one of the bypass transistors is actuated when movement in two directions is sensed.

The control means includes series connected resistors, at least two of which resistors are connected in parallel with bypass transistors, wherein both of the bypass transistors are actuated when movement in three directions is sensed.

The device also includes a housing for enclosing the circuitry. In one embodiment of the invention, the housing is received within a pet toy, such as a plush stuffed animal.

In accordance with another aspect of the present invention, a sound generating device is provided including an accelerometer generating an output signal which is a function of the direction of sensed movement, a sound signal generating circuit, a speaker connected to the sound generating circuit for generating a sound when energized and a control circuit operably connected to control the sound signal generating circuit in accordance with the output signal of the accelerometer.

Preferably, the accelerometer is capable of sensing the direction and the magnitude of movement.

The control circuit causes the sound generating circuit to generate a sound signal to the speaker when the accelerometer senses movement of magnitude exceeding a pre-set level.

The control circuit causes the sound generating circuit to generate a sound signal to the speaker to emit a sound the characteristics of which are dependent upon the number of directions of movement sensed by the accelerometer.

The device further includes a housing into which the accelerometer, the sound generating circuit, and the control circuit are situated. The housing is designed to be received within a toy. The toy is a preferably a pet toy in the form of a plush stuffed animal.

In accordance with another aspect of the present invention, a method for creating a sound is provided. The method includes: sensing movement in more than one direction; generating a sound in response to sensing movement in at least one direction; and controlling the characteristics of the generated sound in accordance with the direction of sensed movement.

The step of sensing movement includes the steps of: sensing the magnitude of movement; and generating the sound when the magnitude of movement in any one direction exceeds a pre-determined level.

The step of sensing movement includes the step of sensing the direction of movement.

The step of controlling the characteristics of the generated sound includes the step of generating a sound with a different characteristic if movement is sensed in more than one direction than if movement is sensed in a single direction.

The method includes the step of controlling the speed of the generated sound by varying the setting of an oscillator in the sound generating circuit in accordance with the number of directions of sensed movement.

The method further includes the steps of creating a housing within which the movement sensing, sound generating and characteristics controlling steps are performed.

The method also includes the step of creating a toy within which the housing is received.

BRIEF DESCRIPTION OF THE SEVERAL VIEWS OF DRAWINGS

To these and to such other objects that may hereinafter appears, the present invention relates to a variable sound generator for a pet toy as described in detail in the following specification and recited in the annexed claims, taken together with the accompanying drawings, in which like numerals refer to like parts and in which:

DETAILED DESCRIPTION OF THE INVENTION

Figure 1:
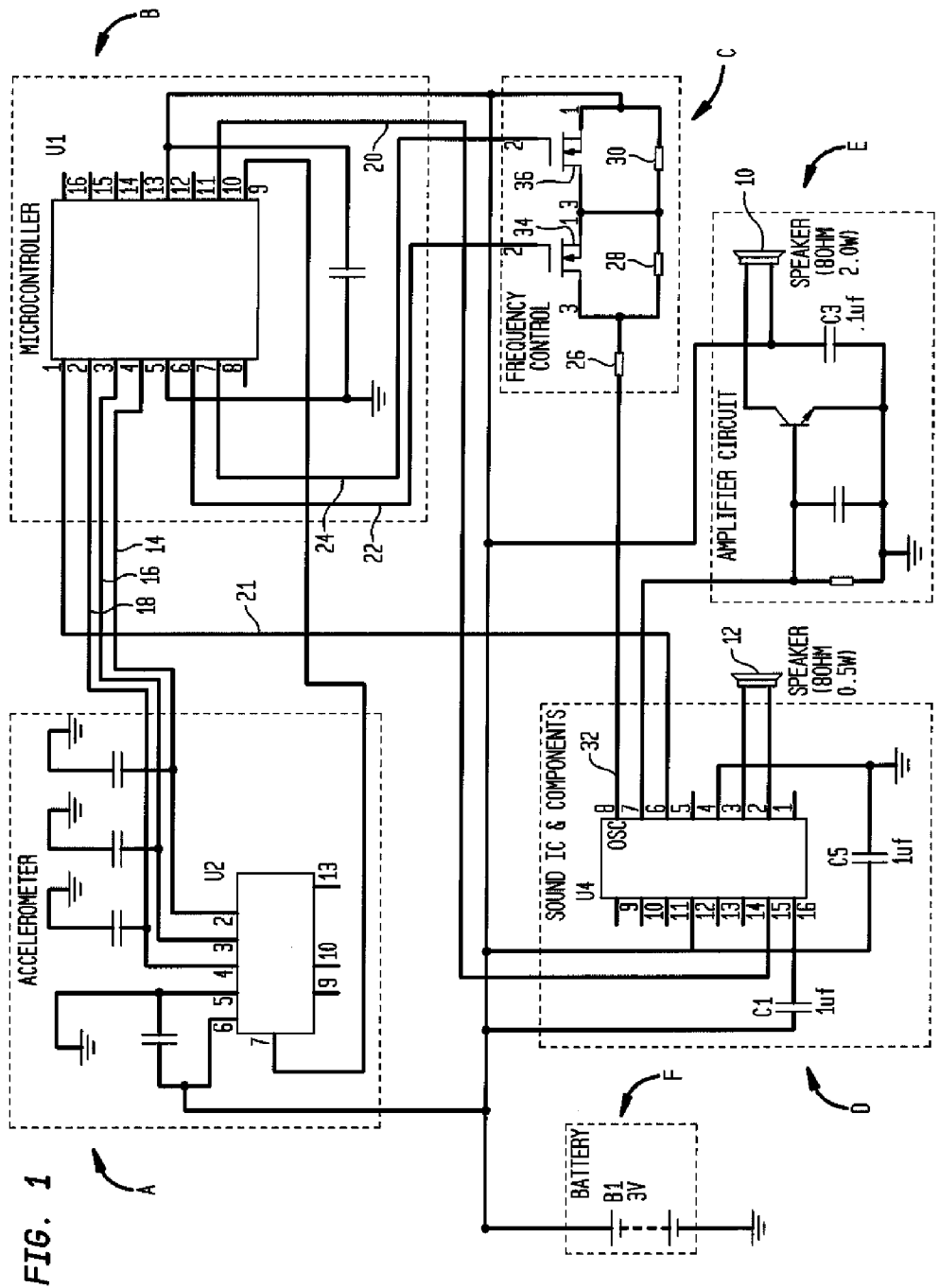
FIG. 1 is a circuit diagram of the components of the present invention.

As seen in FIG. 1, the device of the present invention includes an accelerometer, generally designed A, capable of providing three different output signals to a microcontroller, generally designated B. Microcontroller B is connected to a control circuit, generally designated C, which controls the speed at which a sound chip, generally designated D, processes a pre-recorded sound. Microcontroller B is also directly connected to the sound chip to activate the sound chip and monitor the output thereof. Sound chip D can either drive a speaker 10, which is part of an amplification circuit, generally designated E, or a speaker 12, connected directly to the output of the sound chip. All of the components are powered by a battery, generally designated F.

Accelerometer A is preferably a three axis board mounted accelerometer capable of generating three separate output signals, one for each of the x, y and z directions, on lines 14, 16 and 18, respectively, indicating the magnitude and direction of the motion detected by the accelerometer. One commercially available component suitable for this application is Part No. MMA7361LCT, which is a 1.5G XYZ Low G analog accelerometer supplied by Freescale Semiconductor Inc. of Austin, Tex.

The output lines 14, 16 and 18 from accelerometer A are connected to three of the inputs of microcontroller B. Microcontroller B is connected to the sound chip by lines 20 and 21 such that it can turn the sound chip on or off, and can monitor the output of the sound chip. It also provides signals to set the speed of operation of the sound chip, and hence the frequency of the sound signal generated by the sound chip, by selectively actuating transistors in control circuit C through output lines 22 and 24.

The microcontroller receives the three output signals from the accelerometer and determines if any one of the output signals has a magnitude above a pre-determined level, indicating motion detected above a threshold level in the direction associated with the line on which that output signal is present. It regulates the speed of the sound signal in accordance with the output signals from the accelerometer.

If an output signal indicating movement above the threshold level is detected on any of the output lines, an output is generated by the microcontroller on line 20 to sound chip D activating the sound chip D to generate a sound signal at a first speed. If an output signal indicating motion above the threshold level is detected on at least two of the output lines, a high voltage output is generated by the microcontroller on line 22. If an output signal indicating motion above the threshold level is detected on all three output lines, a high voltage output is generated by the microcontroller simultaneously on both line 22 and line 24.

The microcontroller incorporates a timing circuit which includes a clock. The clock regulates the speed at which the microcontroller operates. The clock runs continuously but the timing circuit is activated once movement above the threshold level is detected in any direction and will cause the sound chip to continue to generate that sound signal for a time period determined by the length of the pre-recorded sound and for a short period thereafter, for example 2 seconds, after movement ceases, unless prior to timing out, movement in an additional direction is detected, in which case the speed of the sound chip will be reset and the pre-recorded sound will play at a different speed.

One commercially available microcontroller suitable for this application is Part No. HT46R064, which is an enhanced A/D Type 8-bit OTP MCU supplied by Holtek Semiconductor (USA), Inc. of Fremont Calif.

Control circuit C includes three series connected resistors 26, 28 and 30, which may have different resistance values. The resistors are connected between the battery F and the oscillator input 32 of sound chip D.

The control signal from the control circuit is applied to the oscillator input of the sound chip and sets the speed that the chip processes a pre-recorded sound. The speed at which the sound chip processes the pre-recorded sound determines the character of the sound that is generated. In this case, the sound chip can operate at three different speeds and hence the device can generate sounds with three different characteristics.

When the sound chip is turned on by a signal on output line 20, but no output signals are present on microcontroller output lines 22 or 24, the combined resistance of resistors 26, 28 and 30 sets the oscillator of the sound chip to cause the sound chip to generate the pre-recorded sound, which under those circumstances, will be generated at a first speed. That occurs when motion in any single direction above the threshold level is detected.

Two bypass transistors 34 and 36 are also included in the control circuit. The gate of transistor 34 is connected to output line 22 of microcontroller B. The gate of transistor 36 is connected to output line 24 of microcontroller B. The output circuit of transistor 34 is connected in parallel with resistor 28. The output circuit of transistor 36 is connected in parallel with resistor 30.

When transistor 36 is turned on, resistor 28 is bypassed, and the overall resistance of the resistor circuit is reduced, thereby changing the setting of the oscillator and causing the sound chip to generate a sound signal at a second speed. When both transistor 36 and transistor 38 are turned on, resistor 28 and resistor 30 are both bypassed, and the overall resistance of the resistor circuit is further reduced, thereby changing the setting of the oscillator and causing the sound chip to generate a sound signal at a third speed.

The sound signal from sound chip D can be applied directly to drive a speaker 12. Alternatively, the sound signal can be connected to the input of an amplifier circuit E which includes speaker 10. The advantage of using the amplifier circuit E is that the sound generated by the sound chip may be louder and the amplitude of the sound signal may be either pre-set or varied as appropriate.

The sound chip also has an output line 21 which is connected to an input of microcontroller B. A signal from the sound chip on output line 21 indicates that the sound chip is generating a sound signal. Thus, the microcontroller can monitor the sound signal output of the sound chip such that it knows when a sound signal is being generated and when it is not.

It should be noted that the microcontroller activates the sound chip and the control circuit independently. Thus, if the sound chip is not operational and the device is simultaneously moved at a magnitude above the threshold level in two directions, the sound chip will generate the sound signal at the second speed, without first generating a sound signal at the first speed.

One commercially available sound chip suitable for use in this application is Part No. aP89010 Voice OTP IC, which is a low voltage CMOS 16-bit bus buffer supplied by Aplus Integrated Circuits Inc. of Taipei, Taiwan.

Figure 2:
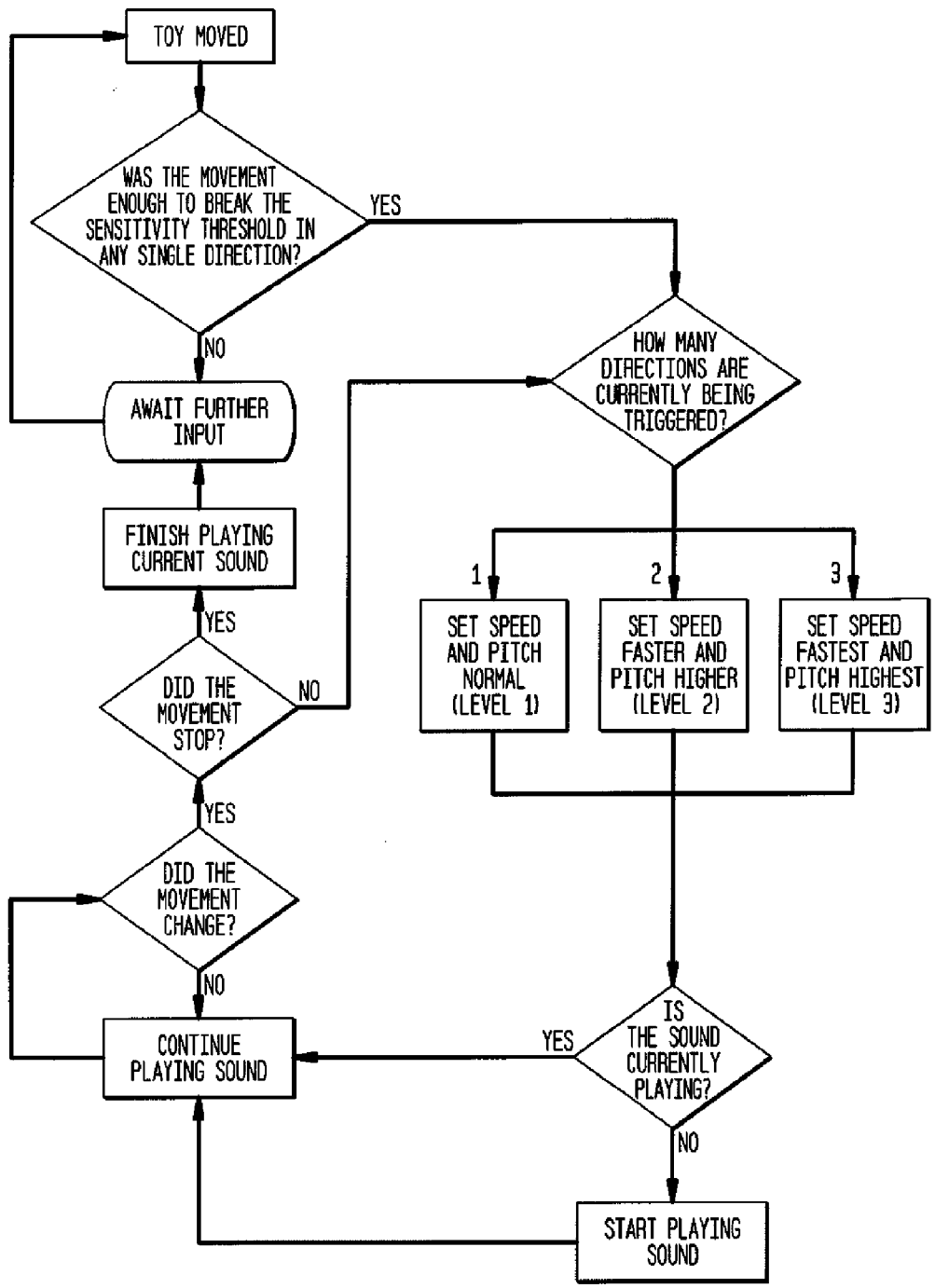
FIG. 2 is a flow chart of the operation of the present invention.

Reference is now made to FIG. 2 which is a flow chart illustrating the steps in the operation of the device of the present invention. When movement is detected in any direction, a determination is made as to whether the magnitude of the motion in any single direction is above a threshold level, indicating that the movement is of sufficient magnitude to cause the sound chip to generate a sound signal. If it is below the threshold, the device does nothing and awaits further input.

If, on the other hand, motion in any direction is detected to be above the threshold level, a determination is made as to how many different directions are currently above the threshold level (that is, being "triggered"). If only one direction is being triggered, the sound chip generates a sound signal at a first speed level (level 1). If two directions are being triggered, the sound chip generates a sound signal at a second speed level (level 2). If three directions are being triggered, the sound chip generates a sound signal at a third speed level (level 3).

The microcontroller monitors the output of the sound chip to determine if the sound signal is currently being generated. If it is not, the microcontroller will cause the sound chip to start generating the sound signal at the appropriate level. If the sound signal is currently being generated, the sound chip continues generating the sound signal.

The microcontroller then makes a determination as to whether there has been a change in the detected movement. If not, the sound chip continues to generate the sound signal. On the other hand, if movement has stopped, the sound chip will stop generating the sound signal and the device awaits further input indicating new movement.

Figure 3:
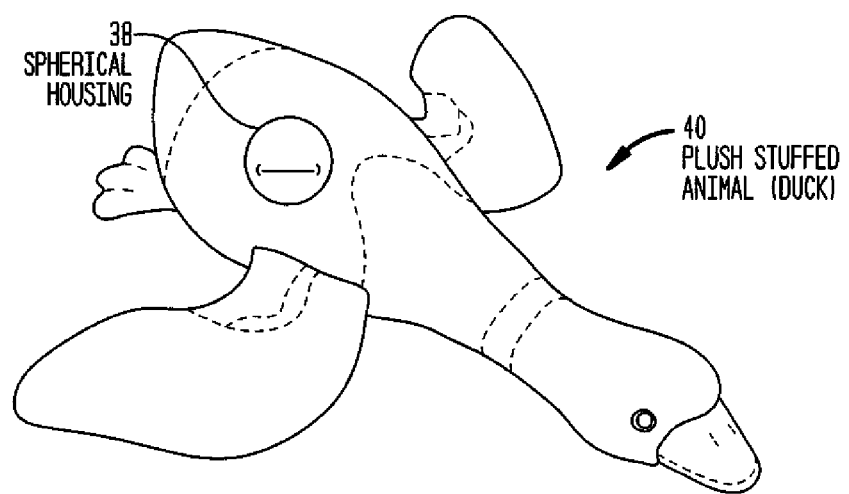
FIG. 3 is a drawing of a typical plush stuffed animal in the form of a duck within which the sound generator of the present invention is situated.

FIG. 3 illustrates a typical toy that the device of the present invention might be used in. The device may be situated in a spherical housing 38 made of plastic or rubber. Housing 38 may be situated in a plush stuffed animal, such as a duck 40. However, neither the particular shape of the housing or the configuration or type of product in which the housing is situated should be considered to be a limitation on the present invention, as the sound generating device of the present invention could be used in a wide variety of different products in which it would be useful to have generated sounds with different characteristics.

It will now be appreciated that the present invention relates to a variable sound generating device suitable for use in a movement-activated product that makes sounds. The sounds are produced as a response to actual movement, rather than from externally applied pressure as in conventional squeeze toys. As the device is thrashed around and its movement changes in direction and/or intensity, the characteristics of the emitted sound also changes. As such, a toy having the present invention can keep the interest of a pet longer than a simple pressure-squeaker mechanism.

The sound generator creates sounds with three different characteristics, depending upon the magnitude and direction of the movement of the device. Sound at the appropriate speed level will be generated once movement of a magnitude above the threshold level is detected and the sound will continue to be generated for a pre-set time period after movement has stopped.

The accelerometer and the sound chip are connected to the microcontroller. A series of three resistors are attached to the oscillator input of the sound chip, which is typically used to set the sound chip clock speed to match the rate at which the sound was recorded. Two of those resistors are connected with "bypass" MOSFETs to allow for different sound activity.

The microcontroller repeatedly polls the accelerometer to see if the device is being moved. If it is, and the movement is above the sensitivity threshold, the microcontroller causes the sound chip to start generating the sound. While it is doing that, the microcontroller also takes note of how many axes are being moved at a magnitude exceeding the sensitivity threshold.

If one axis is being triggered, then nothing regarding speed of the sound signal needs to be set and the combined resistance of all three resistors sets the processing speed of the sound chip. If two axes are being triggered at the same time, the microcontroller sends a high voltage signal to one logic-level MOSFET that bypasses one of the resistors attached to the oscillator of the sound chip. That causes the sound chip to operate faster, causing the sound chip to generate the pre-recoded sound at a higher speed—it essentially acts as if the pre-recorded sound is supposed to be generated at a faster bitrate. If all three axes are being triggered simultaneously, the microcontroller sends a high voltage signal to both logic-level MOSFETs, causing two of the resistors attached to the oscillator of the sound chip to be bypassed, and the speed of the sound signal to be further increased. The default mode of operation for the MOSFETs is normally off when the microcontroller provides a low voltage signal to the gates of the transistors.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A process executing on a three axis acceleration sensitive sound producing apparatus, comprising a three axis accelerometer, a microcontroller, a frequency control circuit, comprising a resistor network, comprising a plurality of series resistors, and an electronic bypass switch circuit, and a sound control and playback module, comprising an oscillator and at least one stored sound, the oscillator and the resistor network forming an oscillator circuit, the process executed by motion of the apparatus sensed by the three axis accelerometer, comprising the steps of:
   (a) sensing, by said three axis accelerometer, said motion of said apparatus;
   (b) measuring, by said three axis accelerometer, acceleration associated with said sensed motion in each direction of three directions;
   (c) generating, by said three axis accelerometer, accelerometer output signals, comprising acceleration information and direction information associated with said measured sensed motion in said each direction of said three directions;
   (d) communicating, by said three axis accelerometer, said generated accelerometer output signals to said microcontroller;
   (e) receiving and processing, by said microcontroller, said communicated accelerometer output signals into frequency control signals;
   (f) communicating, by said microcontroller, said frequency control signals to said frequency control circuit, if any one of said accelerometer output signals exceeds a predetermined threshold;
   (g) receiving, by said frequency control circuit, any said communicated frequency control signals;
   (h) regulating, by said frequency control circuit, series resistance of said resistor network, oscillator frequency of said oscillator circuit, and playback speed of said at least one stored sound by said sound control and playback module, each according to the number of said accelerometer output signals that exceeds said predetermined threshold, comprising:
      bypassing, by said electronic bypass switch circuit, all but three resistors of said plurality of series resistors, if one accelerometer output signal of said accelerometer output signals exceeds said predetermined threshold,
      bypassing, by said electronic bypass switch circuit, all but two resistors of said plurality of series resistors, if two accelerometer output signals of said accelerometer output signals exceed said predetermined threshold,
      bypassing, by said electronic bypass switch circuit, all but one resistor of said plurality of series resistors, if three accelerometer output signals of said accelerometer output signals exceed said predetermined threshold;
      wherein said regulating results in a regulated playback speed;
   (i) playing back, by said sound control and playback module, said at least one stored sound at said regulated playback speed, according to said number of said accelerometer output signals that exceeds said predetermined threshold.

2. The process of claim 1, wherein:
step (f) further comprises:
grouping, by said microcontroller, a sound control output signal, if any one of said accelerometer output signals exceeds said predetermined threshold;
step (i) further comprises:
initiating playback of said at least one stored sound at said regulated playback speed, by said sound control and playback module, upon receipt of said sound control output signal from said microcontroller.

3. The process of claim 1, wherein step (h) further comprises:
increasing playback speed by decreasing said series resistance of said resistor network, by said frequency control circuit;
decreasing playback speed by increasing said series resistance of said resistor network, by said frequency control circuit.

4. The process of claim 1, wherein step (h) further comprises:
regulating, by said frequency control circuit, frequency of said at least one stored sound to be played back in step (i) according to said number of said accelerometer output signals that exceeds said predetermined threshold.

5. The process of claim 1, wherein step (h) further comprises:
regulating, by said frequency control circuit, frequency of said at least one stored sound to be played back in step (i) according to said regulated playback speed.

6. The process of claim 1, wherein said electronic bypass switch circuit comprises a plurality of electronic bypass switches, comprising field effect transistors.

7. The process of claim 1, wherein:
said three axis acceleration sensitive sound producing apparatus further comprises a substantially spherical housing, containing said three axis accelerometer, said microcontroller, said frequency control circuit, and said sound control and playback module.

8. The process of claim 1, wherein step (h) further comprises:
regulating, by said frequency control circuit, playback speed of said at least one stored sound in step (h) in real time according to said number of said accelerometer output signals that exceeds said predetermined threshold.

9. A process executing on a three axis acceleration sensitive sound producing apparatus, comprising a three axis accelerometer, a microcontroller, a frequency control circuit, comprising an oscillator playback speed controller, and a sound control and playback module, comprising an oscillator and at least one stored sound, the oscillator and the oscillator playback speed controller forming an oscillator circuit, the process executed by motion of the apparatus sensed by the three axis accelerometer, comprising the steps of:
(a) sensing, by said three axis accelerometer, said motion of said apparatus;
(b) measuring, by said three axis accelerometer, acceleration associated with said sensed motion in each direction of three directions;
(c) generating, by said three axis accelerometer, accelerometer output signals, comprising acceleration information and direction information associated with said measured sensed motion in said each direction of said three directions;
(d) communicating, by said three axis accelerometer, said generated accelerometer output signals to said microcontroller;
(e) receiving and processing, by said microcontroller, said communicated accelerometer output signals into frequency control signals;
(f) communicating, by said microcontroller, said frequency control signals to said frequency control circuit, if any one of said accelerometer output signals exceeds a predetermined threshold;
(g) receiving, by said frequency control circuit, any said communicated frequency control signals;
(h) regulating, by said frequency control circuit, said oscillator playback speed controller, oscillator frequency of said oscillator circuit, and playback speed of said at least one stored sound by said sound control and playback module, each according to the number of said accelerometer output signals that exceeds said predetermined threshold, comprising:
increasing said playback speed when the number of said accelerometer output signals exceeding said predetermined threshold increases, and
decreasing said playback speed when said number of said accelerometer output signals exceeding said predetermined threshold decreases;
wherein said regulating results in a regulated playback speed;
(i) playing back, by said sound control and playback module, said at least one stored sound at said regulated playback speed, according to said number of said accelerometer output signals that exceeds said predetermined threshold.

10. The process of claim 9, wherein:
step (f) further comprises:
generating, by said microcontroller, a sound control output signal, if any one of said accelerometer output signals exceeds said predetermined threshold;
step (i) further comprises:
initiating playback of said at least one stored sound at said regulated playback speed, by said sound control and playback module, upon receipt of said sound control output signal from said microcontroller.

11. The process of claim 9, wherein step (h) further comprises:
regulating, by said frequency control circuit, frequency of said at least one stored sound to be played back in step (i) according to said number of said accelerometer output signals that exceeds said predetermined threshold.

12. The process of claim 9, wherein:
said three axis acceleration sensitive sound producing apparatus further comprises a substantially spherical housing, containing said three axis accelerometer, said microcontroller, said frequency control circuit, and said sound control and playback module.

13. The process of claim 9, wherein step (h) further comprises:
regulating, by said frequency control circuit, playback speed of said at least one stored sound in step (h) in real time according to said number of said accelerometer output signals that exceeds said predetermined threshold.

* * * * *